US011558306B2

(12) United States Patent
Mortensen et al.

(10) Patent No.: US 11,558,306 B2
(45) Date of Patent: Jan. 17, 2023

(54) SELECTIVE FIDELITY RATES FOR NETWORK TRAFFIC REPLICATION BY A DIGITAL TWIN DEVICE

(71) Applicant: Cisco Technology, Inc., San Jose, CA (US)

(72) Inventors: Magnus Mortensen, Cary, NC (US); Jay Kemper Johnston, Raleigh, NC (US); David C. White, Jr., St. Petersburg, FL (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 105 days.

(21) Appl. No.: 17/132,675

(22) Filed: Dec. 23, 2020

(65) Prior Publication Data

US 2022/0200917 A1 Jun. 23, 2022

(51) Int. Cl.
*H04L 12/825* (2013.01)
*H04L 47/25* (2022.01)
*H04L 43/0888* (2022.01)

(52) U.S. Cl.
CPC .......... *H04L 47/25* (2013.01); *H04L 43/0888* (2013.01)

(58) Field of Classification Search
CPC ........ G06F 15/173; G06F 3/06; G06F 3/0632; G06F 3/0613; G06F 3/0653; G06F 3/067; G06F 12/675; G06F 16/119; G06F 16/128; G06F 11/1466; G06F 11/1464; G06F 16/1774; H04L 67/1095; H04L 41/0816; H04L 41/0886; H04L 67/1097; H04L 69/16; H04L 12/5601; H04L 45/12; H04L 45/24; H04L 45/38; H04L 47/20

USPC .......................................................... 370/235
See application file for complete search history.

(56) References Cited

U.S. PATENT DOCUMENTS

| | | | |
|---|---|---|---|
| 9,479,427 B2* | 10/2016 | Venkataswami | ........ H04L 45/28 |
| 9,565,076 B2* | 2/2017 | Degioanni | .............. H04L 43/12 |
| 11,063,785 B2* | 7/2021 | Milescu | ................ H04L 47/283 |
| 11,349,917 B2* | 5/2022 | Jennings | ............. H04L 67/1095 |
| 2015/0092549 A1 | 4/2015 | Anand et al. | |
| 2018/0205611 A1* | 7/2018 | Gibson | ................. H04L 67/535 |
| 2019/0372826 A1 | 12/2019 | Sherr | |
| 2020/0042536 A1* | 2/2020 | Kaushik | .............. G06F 11/1466 |
| 2022/0014395 A1* | 1/2022 | Milescu | .................. H04L 45/38 |
| 2022/0124001 A1* | 4/2022 | van den Berghe | . G06F 30/3308 |
| 2022/0131718 A1* | 4/2022 | Aebi | ................... H04L 12/2807 |

(Continued)

OTHER PUBLICATIONS

Scalable Network Technologies, "Network Digital Twins for Cyber Resiliency", www.scalable-networks.com, Mar. 10, 2020, 3 pages.

(Continued)

*Primary Examiner* — Man U Phan
(74) *Attorney, Agent, or Firm* — Edell, Shapiro & Finnan, LLC

(57) ABSTRACT

A computer executed process can be configured to identify a network traffic flow of a source network device. The process can select a traffic fidelity rate from a plurality of traffic fidelity rates for sending information regarding the network traffic flow to a digital twin device corresponding to the source network device. The process can transmit the information regarding the network traffic flow to the digital twin device according to the traffic fidelity rate. The digital twin device can be configured to replicate at least one operation of the source network device with respect to the network traffic flow.

20 Claims, 12 Drawing Sheets

(56) References Cited

U.S. PATENT DOCUMENTS

2022/0147253 A1* 5/2022 Sajeepa ................. G06F 3/0632
2022/0156665 A1* 5/2022 Beth ................... B60W 60/001
2022/0166687 A1* 5/2022 Mohalik ............... G06F 9/4856
2022/0171906 A1* 6/2022 Suto ..................... G06K 9/6263

OTHER PUBLICATIONS

Matthias Eckhart et al., "A Specification-Based State Replication Approach for Digital Twins", publications.sba-research.org, Jan. 2018, 12 pages.
Emerson, "Understanding and Applying Simulation Fidelity to the Digital Twin", emerson.com, Jul. 2018, 8 pages.
Calin Boje et al., "Towards a semantic Construction Digital Twin: Directions for future research", Automation in Construction 114, Mar. 27, 2020, 103179, 16 pages.
Bailey Anderson et al., "What is Azure Digital Twins?", Microsoft, Mar. 12, 2020, 4 pages.
Justin John et al., "Digital Twin Creation", GE Research, retrieved from Internet Dec. 23, 2020, 8 pages.
Cisco, "Introduction to Cisco IOS(R) NetFlow," May 2012, 16 pages.

* cited by examiner

SELECTIVE FIDELITY RATES FOR NETWORK TRAFFIC REPLICATION BY A DIGITAL TWIN DEVICE

TECHNICAL FIELD

The present disclosure relates generally to replicating a network device using a digital twin device and, more particularly, to selectively establishing fidelity rates for network traffic flow information for a digital twin device.

BACKGROUND

Digital twin devices (or "digital twins") are replicas of physical devices and non-physical devices. For example, a digital twin can include a virtual replica and/or a physical replica of another device, which may be physical or non-physical. In a networking environment, digital twins can be used to model networks, network capabilities, and/or network devices for purposes of testing configuration changes, traffic loads, etc. In order to be an effective replica, the digital twin obtains sufficient network traffic flow information, such as control plane configuration and/or data plane traffic information, to meaningfully test and/or reflect operation of the source device being replicated. However, replicating full packet information can be prohibitively resource intensive, especially for source devices with high traffic throughput.

DESCRIPTION OF EXAMPLE EMBODIMENTS

Overview

Figure 1:
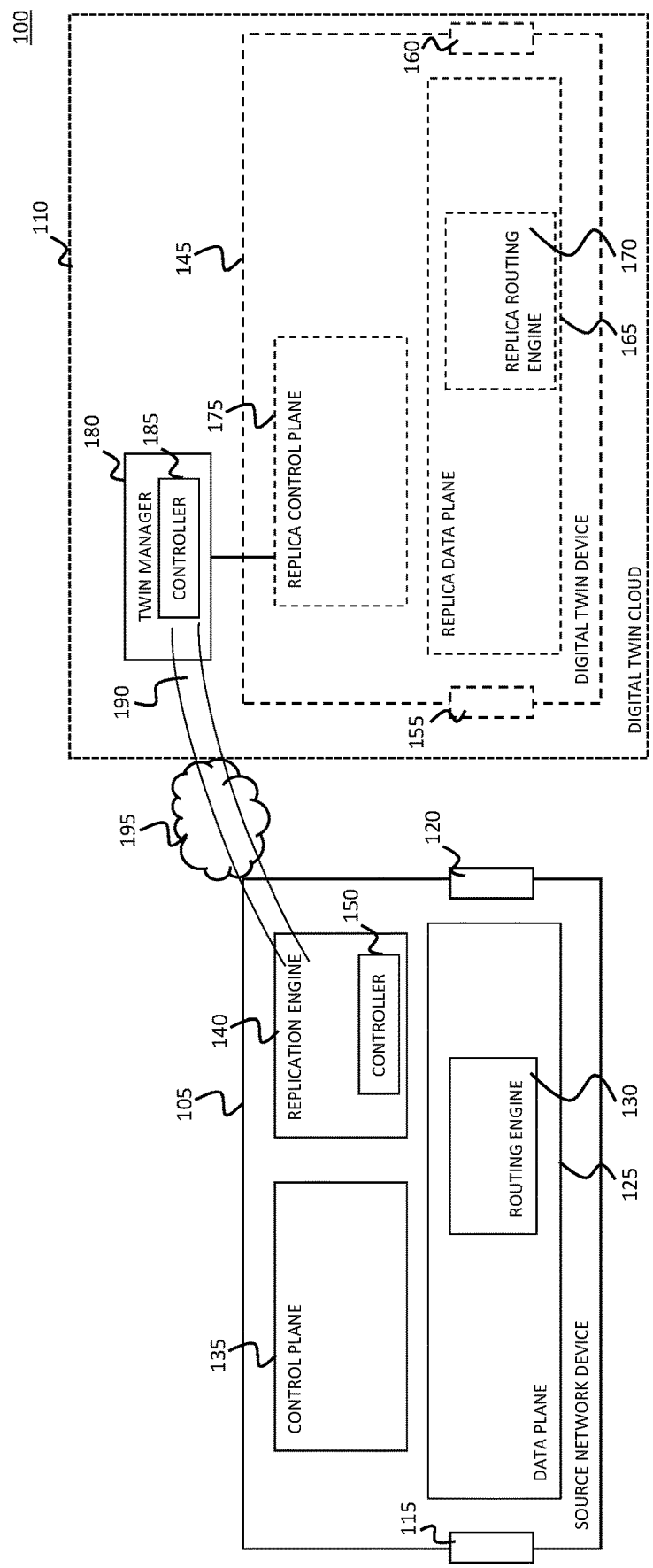
FIG. 1 is a diagram of a system for providing selective fidelity rates for network traffic replication by a digital twin device, according to an example embodiment.

A computer executed process can be configured to identify a network traffic flow of a source network device. The process can select a traffic fidelity rate from a plurality of traffic fidelity rates for sending information regarding the network traffic flow to a digital twin device corresponding to the source network device. The process can transmit the information regarding the network traffic flow to the digital twin device according to the traffic fidelity rate. The digital twin device can be configured to replicate at least one operation of the source network device with respect to the network traffic flow.

Example Embodiments

Presented herein are systems and methods for providing selective fidelity rates for network traffic replication by a digital twin device. A source network device is a network device configured to forward and/or process packets of data. In this context, a "network device" can include a physical device or a combination of one or more virtual functions providing a network capability, such as a group of virtualized functions for providing routing, switching, inspection, and/or other network related services. For example, a source network device can include a switch, router, hub, bridge, gateway, modem, access point, or any other network device now known or hereinafter developed, or any virtual function or combination of virtual functions providing one or more network capabilities.

A computer executed process, which may be included in the source network device or external to the source network device, can be configured to create one or more digital twin devices corresponding to the source network device. Each digital twin device can include a virtual and/or physical replica (e.g., a "digital clone") of the source network device or one or more components thereof. Each digital twin device can be configured to replicate at least one operation of the source network device with respect to a network traffic flow, e.g., for modeling, simulation, testing, or other purposes. For example, a digital twin device can be configured to model packet inspection or other operations with respect to data in the network traffic flow.

In order to replicate the operation(s) of the source network device, the digital twin device receives information regarding the network traffic flow. The computer executed process can be configured to select an appropriate fidelity rate (a "traffic fidelity rate") for this information. The traffic fidelity rate is an amount of "realism" associated with the information relative to the actual network traffic flow. For example, the traffic fidelity rate can be selected from a full packet replication fidelity rate, a per packet metadata replication fidelity rate, or a traffic profile replication fidelity rate.

A full packet replication fidelity rate can provide "full realism" by including a full packet-by-packet replication of data entering the source network device, along with metadata about whether the packets were processed or dropped in the existing data path. While this fidelity rate can provide a relatively accurate representation of the network traffic flow, it typically consumes a high level of bandwidth and processing power, which can be impracticable in certain applications. For example, two packets may be required to replicate a single (e.g., 1500 byte) packet with a full packet replication fidelity rate since the full packet replication includes added headers and ingress and egress metadata.

A per packet metadata replication fidelity rate can provide "partial realism" by including packet metadata without including full packet-by-packet replication of data. For example, instead of replicating the full packet, the packet metadata can be transmitted with data indicating that the corresponding packet should have a data pattern of all 0's (or another value or other contents based on the settings in the packet header, which may or may not mirror the payload of the original packet being replicated). In certain applications, this fidelity rate can provide enough information regarding the network traffic flow to enable the digital twin device to represent and validate like-for-like traffic handling while reducing performance and bandwidth impact relative to the full packet replication fidelity rate. However, this fidelity rate may be inadequate for certain applications that require full packet replication and, despite not including such replication, can still require considerable bandwidth to accurately provide a reliable simulated flow.

A traffic profile replication fidelity rate can provide "simulated realism" by providing traffic/connection metadata without sending packet-by-packet information. For example, this fidelity rate can provide the digital twin device with traffic flow characteristics, such as packet size, rate, protocol, and/or port information. In addition, or in the alternative, the digital twin device may be provided information regarding any actions taken by the source network device with respect to the traffic, such as one or more routing decisions, egress interface information, an indication whether the traffic stream was dropped, etc. In certain applications, this fidelity rate can provide enough information regarding the network traffic flow to enable the digital twin device to replicate ingress traffic patterns and/or estimate performance number and throughput calculations for general traffic types. However, this fidelity rate may be inadequate for certain applications that require packet-by-packet information and/or payloads. For example, validating a like-for-like environment can be difficult using this fidelity rate because the digital twin device has limited information regarding what happens to the ingressing (ingress) traffic stream, and the digital twin device cannot complete testing of inspection or other application layer gateway (ALG) type implementations, which rely on payload details to make their decisions.

The computer executed process can be configured to balance these considerations to select an appropriate traffic fidelity rate for each particular application, network traffic type (e.g., SIP, H.323, file transfer protocol (FTP), hypertext transfer protocol (HTTP), hypertext transfer protocol secure (HTTPS), etc.), and/or network traffic flow. For example, the traffic fidelity rate for a particular application, network traffic type, and/or network traffic flow can be selected based on a configuration of the source network device, a configuration of the digital twin device, an amount of available resources at the source network device for traffic replication, an amount of available resources at/for the digital twin device, and/or an available bandwidth on a connection from the source device to the digital twin device. Consideration of the configuration of the source network device can include, e.g., determining whether the source network device is configured to complete a high level inspection or other operation for the network traffic flow. For example, if the traffic flow includes an FTP connection, and the source network device is configured for inspecting FTP, then the computer executed process may select a fidelity rate that replicates at least up through layer 4 (the transport layer) in the open systems interconnection (OSI) model.

For example, if the source network device is not configured to process a particular type of traffic through a higher level inspection, there may be little to no value in replicating that traffic with a full packet replication fidelity rate. Similarly, if a source network device is configured to inspect and analyze a specific type of traffic, it may be advantageous to replicate packets in full so that the digital twin device may execute the same inspection/analysis. In addition, consideration may be given to the configuration of the digital twin device, including whether and to what degree the digital twin device is configured differently from the source network device. For example, the computer executed process may select a higher traffic fidelity rate than it otherwise would select with respect to a particular source network device if a digital twin device corresponding to the source network device is configured to perform certain inspections, analyses, and/or other operations beyond those configured to be performed by the source network device.

The computer executed process can be configured to assess these different configurations to establish a traffic fidelity rate, which is achievable with the amount of available resources at the source network device for traffic replication (and/or the amount of available resources/bandwidth for the digital twin device and/or the connection between the source network device and the digital twin device), and provides at least a minimum amount of information needed in view of the configurations at the source network device and the digital twin network device. Thus, an appropriate level of data accuracy may be provided while minimizing bandwidth and other resource constraints. By performing this assessment by traffic flow, traffic type, and/or application, realism variation may be provided for different traffic at a same time. For example, a full packet replication fidelity rate may apply to certain classes of traffic, while a per packet metadata replication fidelity rate or traffic profile replication fidelity rate may apply to certain other classes of traffic. For each network traffic flow, information regarding the network traffic flow can be transmitted to the digital twin device according to the selected traffic fidelity rate.

In an example embodiment, the computer executed process can be configured to monitor the transmitting of the information regarding the network traffic flow to the digital twin device and change the traffic fidelity rate to a new traffic fidelity rate based on the monitoring. For example, the traffic fidelity rate can be changed in response to detected congestion in the transmitting, detected packet loss in the transmitting, a change in the amount of available resources available at the source network device and/or digital twin device for traffic replication, a change in the configuration of the source network device, a change in the configuration of the digital twin device, an instruction by the digital twin device to cease providing a particular type of the information, and/or a change in the mix of traffic types at the source device. Thus, replication fidelity can transition as appropriate to address operational requirements and resource availability.

Referring initially to FIG. 1, an example system 100 for providing selective fidelity rates for network traffic replication can include a source network device 105 and a digital twin cloud 110. The source network device 105 is a network device configured to forward and/or process packets of data, e.g., through a data path from an ingress location 115 to an egress location 120. For example, each of the ingress location 115 and the egress location 120 can include a port or other interface of a physical device or a perimeter or other demarcation of a virtual device, virtual function, and/or application. Thus, each of the ingress location 115 and egress location 120 may include, e.g., a physical entrance/exit of a device and/or a virtual "entrance/exit" of one or more functions, which may or may not constitute, or be located at, a physical entrance/exit. The source network device 105 includes a data plane 125, which generally includes logic and/or processes for forwarding data packets/frames, e.g., through a routing engine 130. The source network device 105 further includes a control plane 135, which generally includes logic and/or processes for determining how the data packets/frames will be processed/forwarded.

In an example embodiment, the source network device 105 includes a replication engine 140, which includes logic and/or processes for managing replication and/or provision, by the source network device 105, of network traffic information to the digital twin cloud 110, for use by one or more digital twin devices 145. In particular, as described in more detail below, the replication engine 140 includes a controller 150 configured to identify network traffic flows and, for each network traffic flow, type of network traffic flow, and/or application associated with the network traffic flows, select a traffic fidelity rate for sending information regarding the network traffic flow to the digital twin cloud 110. The controller 150 is further configured to transmit the information regarding the network traffic flow to the digital twin cloud 110, for use by the digital twin device 145.

The digital twin device 145 includes logic and/or processes for replicating at least one operation of the source network device 105 with respect to the network traffic flow. For example, the digital twin device 145 can be configured to model packet inspection (e.g., ALG inspection or otherwise) or other operations with respect to data in the network traffic flow. To enable the modeling, the digital twin device 145 includes (virtual and/or physical) replicas of certain features/functions of the source network device 105. In particular, the digital twin device 145 includes a replica ingress location 155 that generally corresponds to, and is configured to function substantially similar to, the ingress location 115 of the source network device 105, a replica egress location 160 that generally corresponds to, and is configured to function substantially similar to, the egress location 120 of the source network device 105, a replica data plane 165, including a replica routing engine 170, that generally corresponds to, and is configured to function substantially similar to, the data plane 125, including the routing engine 130, of the source network device 105, and a replica control plane 175 that generally corresponds to, and is configured to function substantially similar to, the control plane 135 of the source network device 105.

The components of the source network device 105 and of the digital twin device 145 may be implemented with any combination of hardware (e.g., digital logic gates in one or more Application Specific Integrated Circuits (ASICs) or software running on a processor.

In an example embodiment, a twin manager 180 includes logic and/or processes for enabling the creation and operation of the digital twin device 145. In particular, the twin manager 180 includes a controller 185 configured to create, and manage the flow and fidelity of network traffic information to, digital twin devices, including the digital twin device 145. For example, the controller 185 can cooperate with the controller 150 of the replication engine 140 of the source network device 105 to establish a secure tunnel 190, across a network 195, through which hardware and software profile information, network traffic information, etc., can be provided to the controller 185 for instantiating, and managing the operation of, the digital twin device 145. The network 195 includes any communications medium for transmitting information between two or more computing devices, such as a computing device embodying or including the source network device 105 and a computing device embodying or including the digital twin cloud 110 and/or twin manager 180. For example, the network 195 can include a local area network (LAN), wide area network (WAN), virtual private network (VPN), Intranet, Internet, hardwire connections, modem connections, wireless connections, or combinations of one or more these items. The controller 185 and controller 150 can communicate through the network 195 to create, dissolve, maintain, and otherwise command and control the secure tunnel 190.

While the digital twin cloud 110 is depicted in FIG. 1 as a single entity, it should be appreciated that certain components of the digital twin cloud 110—for example, the twin manager 180 and digital twin device 145—may be separate and physically distinct entities in alternative example embodiments. In addition, or in the alternative, at least certain of the features and/or functionality of the twin manager 180 and digital twin device 145 may be integrated into a single entity, certain of the features and/or functionality described herein in connection with the twin manager 180 may be included in, and/or performed by, the digital twin device 145, and/or certain of the features and/or functionality described herein in connection with the digital twin device 145 may be included in, and/or performed by, the twin manager 180.

In an example embodiment, the controller 185 is configured to cooperate with the controller 150 to establish a traffic fidelity rate for sending information regarding network traffic flows of the source network device 105 for use by the digital twin device 145. For example, the controller 150 and/or controller 185 can select the traffic fidelity rate for each network traffic flow, type of network traffic flow, and/or application associated with the network traffic flows from options including a full packet replication fidelity rate, a per packet metadata replication fidelity rate, and a traffic profile replication fidelity rate. The selection may involve a variety of considerations, such as (but not limited to) a configuration of the source network device 105, a configuration of the digital twin device 145, an amount of available resources available at the source network device 105 for traffic replication, an amount of available resources for the digital twin device 145, and/or an available bandwidth for the connection between the source network device 105 and the digital twin device 145 (e.g., along the tunnel 190), etc.

For example, the controller 150 can be configured to self-interrogate to determine (a) how much available resources it can allocate to replication in order to not overload its own capabilities, and (b) the configuration of the source network device 105, including, e.g., what features are enabled and what layers of OSI model they act upon. As may be appreciated, the source network device 105 may be configured to run different inspections on the traffic based on its protocol (e.g., SIP traffic may go through an SIP ALG). Using this information, the controller 150 can potentially replicate, packet-by-packet, the traffic that would match a specific protocol or flow that the source network device 105 inspects. However, the ability of the source network device 105 to replicate is limited by its available resources; if the source network device 105 has limited resources, it may be unable to replicate traffic or may require a lower traffic fidelity rate than otherwise may be preferred in view of its configured inspections, etc.

The controller 150 and controller 185 can cooperate to transmit information regarding the network traffic flow to the digital twin device 145 according to the selected traffic fidelity rate. For example, the controller 150 can transmit the information to the twin manager 180 through the tunnel 190, with the twin manager 180 then providing the information to the digital twin device 145. Alternatively, the controller 150 can transmit the information directly to the digital twin device 145.

In an example embodiment, the controller 150 and controller 185 can cooperate to monitor the transmitting of the information regarding the network traffic flow to the digital twin device 145 (and/or twin manager 180, as applicable) and change the traffic fidelity rate to a new traffic fidelity rate based on the monitoring. For example, the traffic fidelity rate can be changed in response to detected congestion in the transmitting, detected packet loss in the transmitting, a change in the amount of available resources available at the source network device 105 for traffic replication, a change in the configuration of the source network device 105, a change in the configuration of the digital twin device 145, an instruction by the digital twin device 145 (e.g., via the twin manager 180) to cease providing a particular type of the information, and/or a change in the mix of traffic types at the source network device 105. Thus, replication fidelity can transition as appropriate to address operational requirements and resource availability.

While the controller 150 and controller 185 are depicted in FIG. 1 as separate and physically distinct entities, it should be appreciated that at least certain of the features and/or functionality of the controller 150 and controller 185 may be integrated into a single entity, certain of the features and/or functionality described herein in connection with the controller 150 may be included in, and/or performed by, the controller 185, and/or certain of the features and/or functionality described herein in connection with the controller 185 may be included in, and/or performed by, the controller 150.

Figure 2:
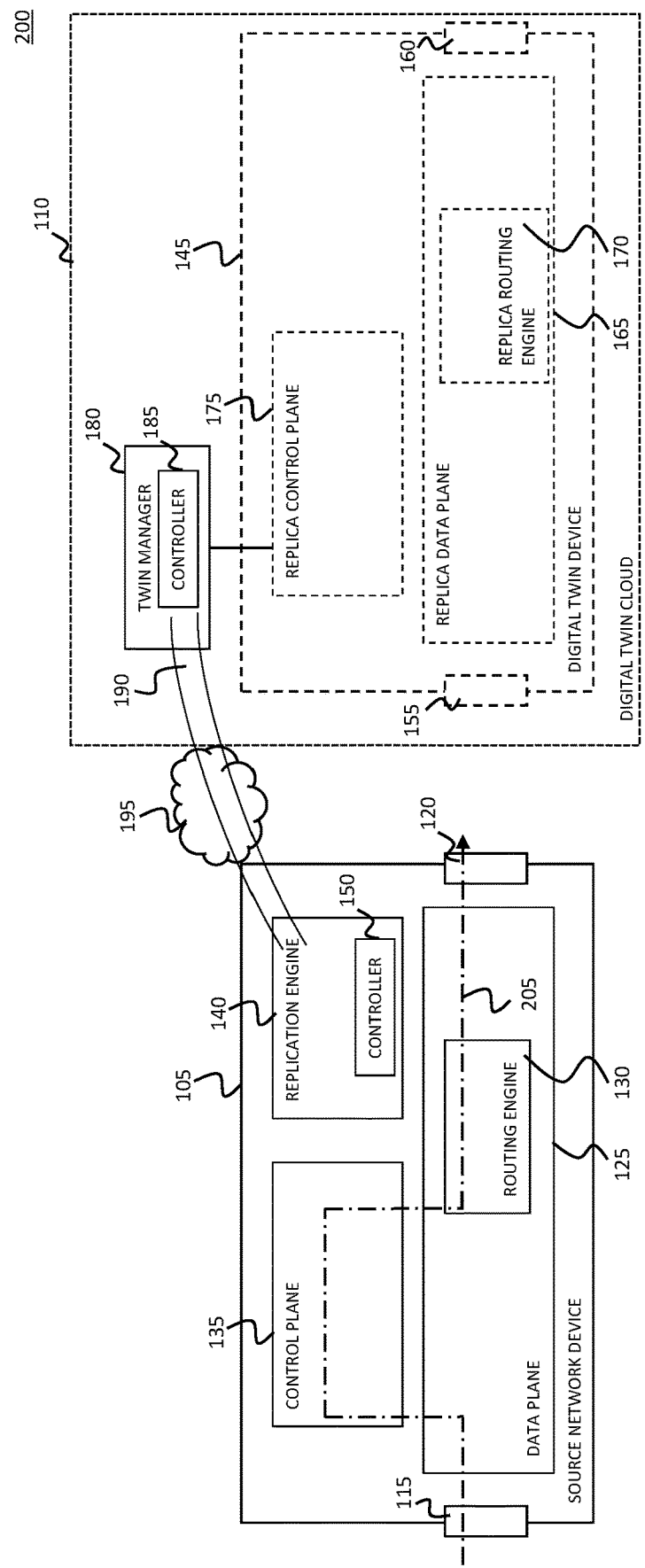
FIG. 2 is a diagram depicting a network traffic flow through a source network device, according to an example embodiment.

FIG. 2 is a diagram depicting an operation 200 in which there is a network traffic flow 205 through the source network device 105, according to an example embodiment. The network traffic flow 205 includes packets of data flowing into the source network device 105 at the ingress location 115. The packets are transmitted and/or processed generally along a data path from the ingress location 115 to the egress location 120, through the data plane 125, control plane 135, and routing engine 130. The packets are inspected through a session initiation protocol (SIP) ALG or other inspection process via the control plane 135.

Figure 3:
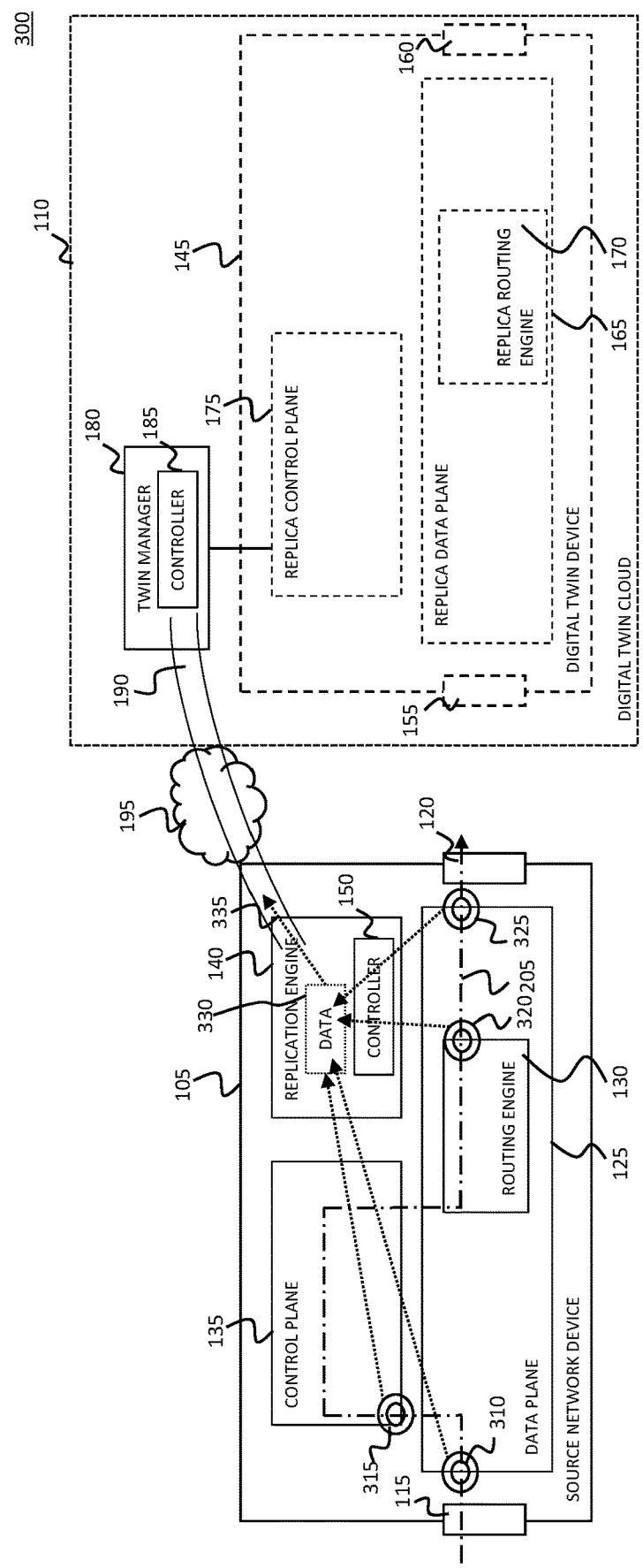
FIG. 3 is a diagram depicting an operation for providing selective fidelity rates for network traffic replication by a digital twin device, according to an example embodiment.

FIG. 3 is a diagram depicting an operation 300 for providing selective fidelity rates for network traffic replication by the digital twin device 145 with respect to the network traffic flow 205, according to an example embodiment. In the operation 300, the controller 150 and/or controller 185 have elected to use a full packet replication fidelity rate. For example, the controller 150 and/or controller 185 may have selected the full packet replication fidelity rate, at least in part, because the source network device 105 is configured to complete a high level inspection (e.g., SIP ALG or another inspection process) on data in the network traffic flow 205, and a higher traffic fidelity rate would enable a more accurate replication by the digital twin device 145 of that high level inspection.

In the operation 300, packet information is collected at multiple stages, namely, stage 310, stage 315, stage 320, and stage 325. Stage 310 occurs generally at a point where a packet of the network traffic flow 205 has flowed through the ingress location 115 and is entering the data plane 125. For example, information collected at stage 310 can include metadata about the ingress location 115, such as information regarding an interface of the ingress location 115. Stage 315 occurs generally at a point where the packet has flowed into the data plane 125 and from the data plane 125 to the control plane 135. For example, information collected at stage 315 can include a full copy of the packet and its payload. Stage 320 occurs generally at a point where the packet has flowed through, and is exiting, the routing engine 130. For example, information collected at stage 320 can include a post processing hash of the packet. Stage 325 occurs generally at a point where the packet is exiting the data plane 125 and entering the egress location 120. For example, information collected at stage 325 can include metadata about the egress location 120, such as information regarding an interface of the egress location 120.

The controller 150 is configured to bundle all of the information collected at stage 310, stage 315, stage 320, and stage 325 into a data file 330 for transmission to the digital twin cloud 110, as shown at 335. In an example embodiment, transmission may (but does not have to) involve compression of the data file 330. Note that, in the case of certain types of traffic (e.g., SIP), replication may involve certain traffic being replicated in real time or near-real time, while associated streams (e.g., a Real-time Transport Protocol (RTP) stream) may only be replicated at periodic intervals.

Notably, operation 300 provides a highly accurate representation of the network traffic flow 205, including a packet-by-packet replication of data entering the ingress location 115, along with metadata about processing of the data (including, e.g., whether packets were processed or dropped) along the data path of the source network device 105. However, this operation 300 is resource intensive, requiring, on average, slightly more bandwidth per packet being replicated than the packet itself.

Figure 4:
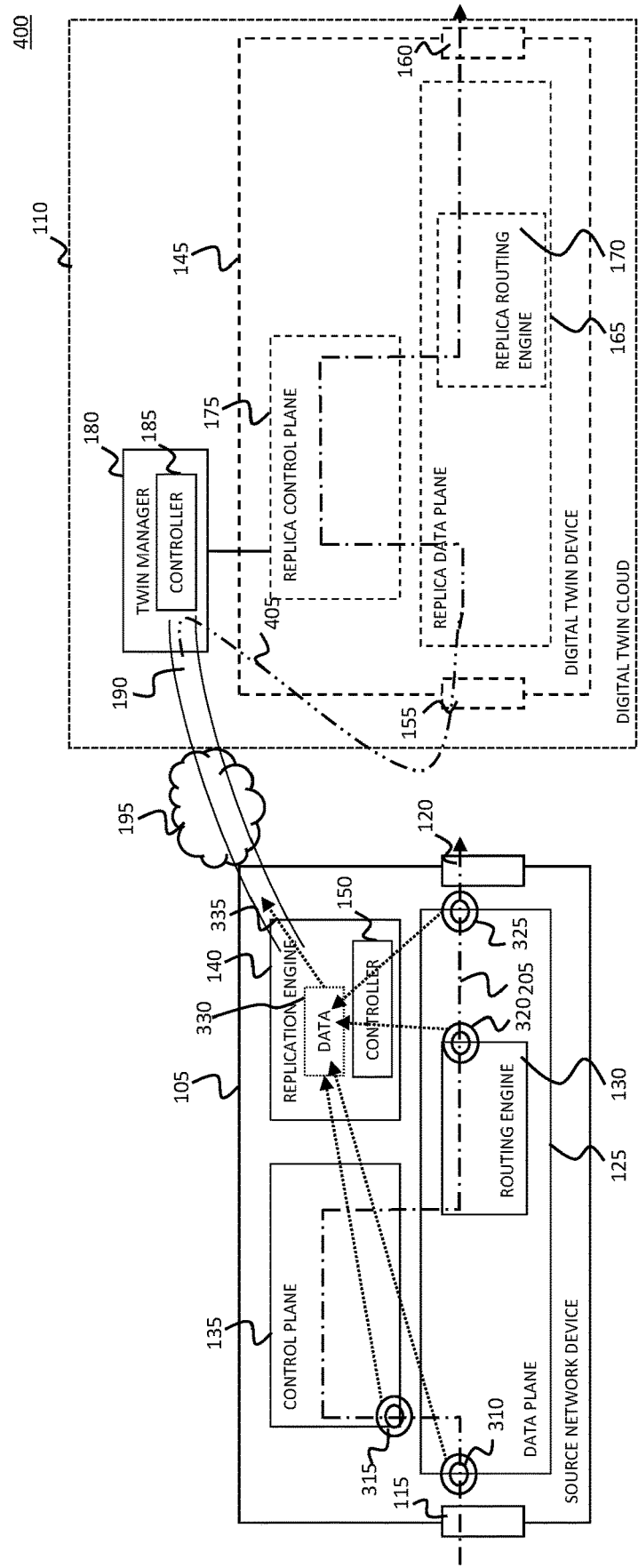
FIG. 4 is a diagram depicting a further operation for providing selective fidelity rates for network traffic replication by a digital twin device, according to another example embodiment.

FIG. 4 is a diagram depicting a further operation 400 using the information collected and transmitted in operation 300. In particular, in operation 400, the controller 185 causes the information (which may be a verbatim copy of the information provided by the controller 150 or an edited or otherwise processed version of the information provided by the controller 150), to be provided to the digital twin device 145, as shown at 405. For example, the digital twin device 145 can transmit and/or process the information through a replica data path (akin to the data path of the source network device 105) including the replica ingress location 155, replica data plane 165, replica control plane 175, replica routing engine 170, and replica egress location 160.

This transmission and/or processing can be used for a variety of reasons, including, for example, for modeling, simulating, and/or testing purposes. For example, the digital twin device 145 can use the information to model, simulate, and/or test one or more operations of the source network device 105, such as a high level inspection (e.g., SIP ALG or another inspection process. As may be appreciated, the operation 400 is illustrative and can vary in alternative example embodiments. For example, as noted above, the controller 150 of the replication engine 140 may provide the data file 330 directly to the digital twin device 145, rather than the twin manager 180, in an alternative example embodiment.

Figure 5:
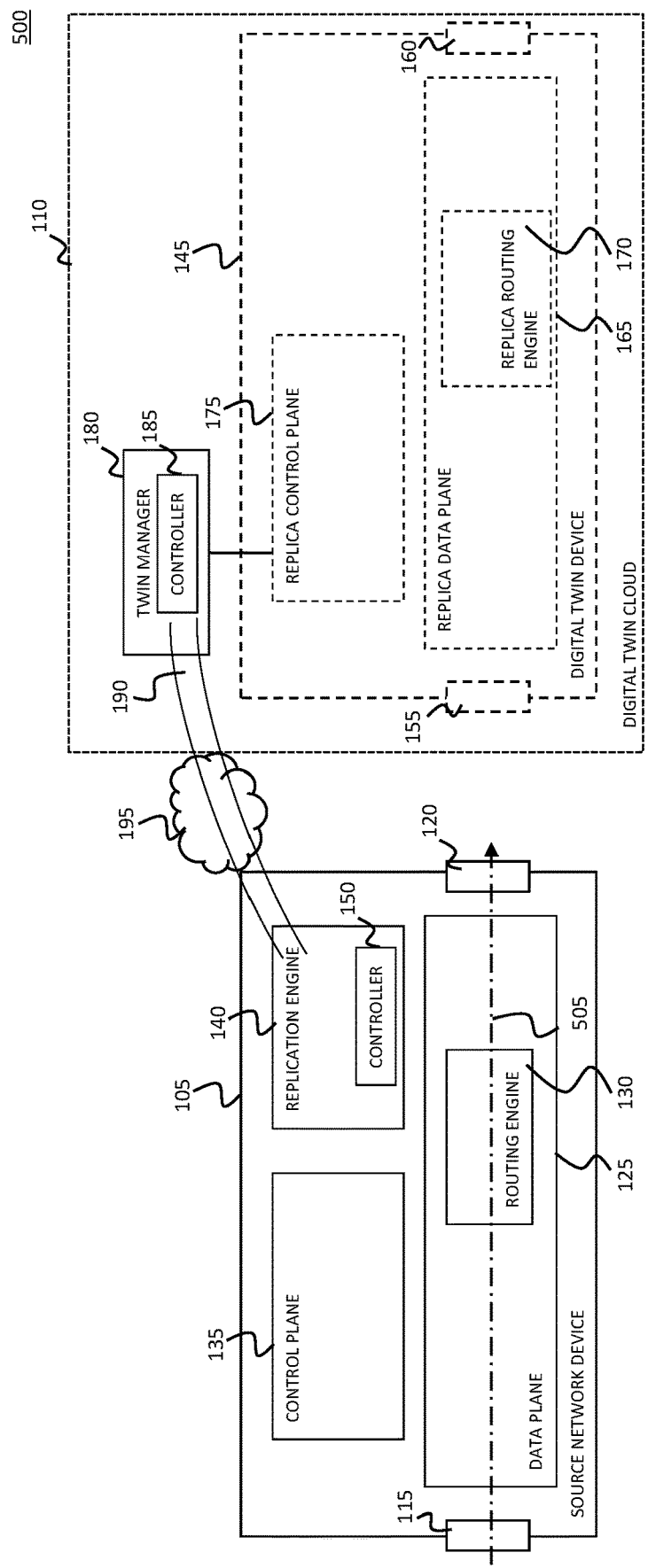
FIG. 5 is a diagram depicting a network traffic flow through a source network device, according to an alternative example embodiment.

FIG. 5 is a diagram depicting an operation 500 in which there is a network traffic flow 505 through the source network device 105, according to an alternative example embodiment. The network traffic flow 505 includes packets of data flowing into the source network device 105 at the ingress location 115. The packets are transmitted and/or processed generally along a path from the ingress location 115 to the egress location 120, through the data plane 125, including the routing engine 130. Unlike the network traffic flow 205 described above with reference to FIGS. 2-4, the data path of the packets in the network traffic flow 505 does not flow through the control plane 135, e.g., because the packets are not inspected through an SIP ALG or other high level inspection process (or otherwise). For example, the network traffic flow 505 may involve (but does not have to involve) traffic from a transmission control protocol (TCP) connection.

Figure 6:
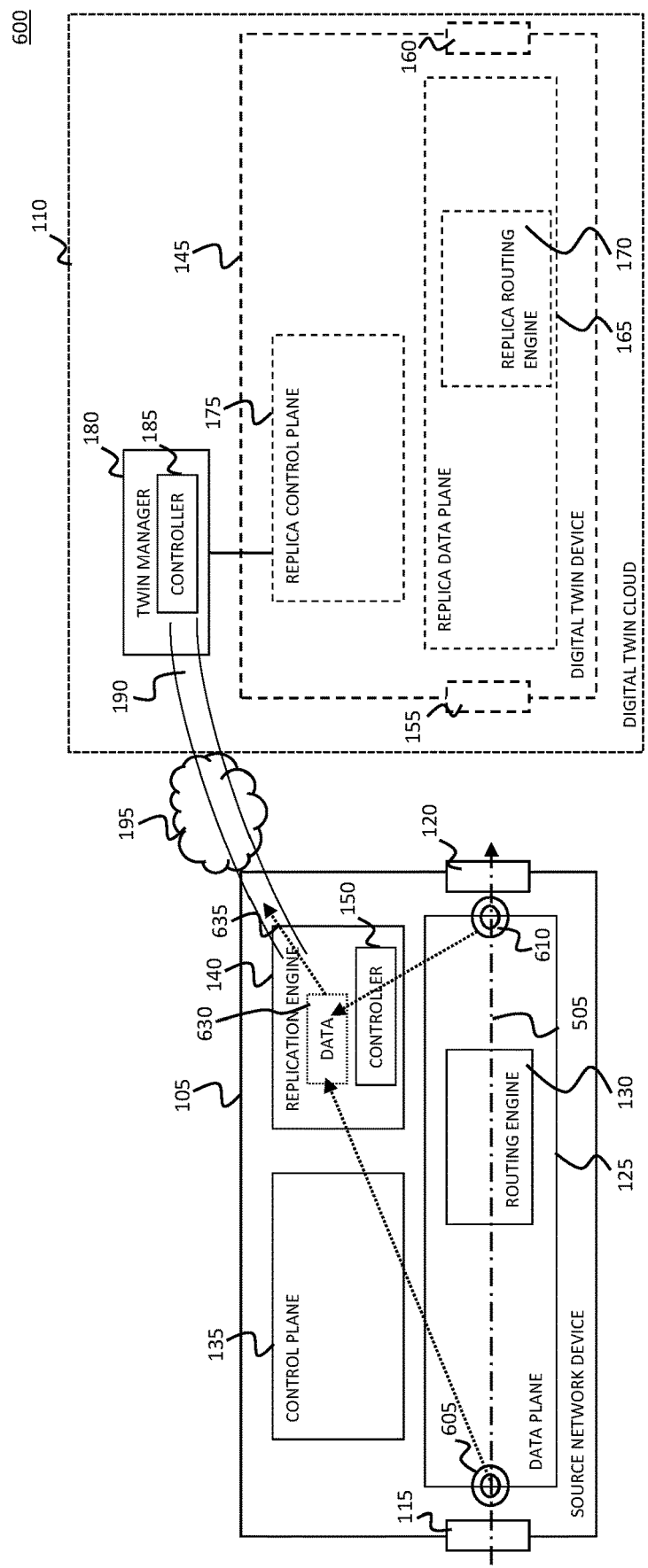
FIG. 6 is a diagram depicting an operation for providing selective fidelity rates for network traffic replication by a digital twin device, according to an alternative example embodiment.

FIG. 6 is a diagram depicting an operation 600 for providing selective fidelity rates for network traffic replication by the digital twin device 145 with respect to the network traffic flow 505, according to an example embodiment. In the operation 600, the controller 150 and/or controller 185 have elected to use a per packet metadata replication fidelity rate. For example, the controller 150 and/or controller 185 may have selected the per packet metadata replication fidelity rate, at least in part, because the source network device 105 is not configured to complete a high level inspection (e.g., SIP ALG or another inspection process) on data in the network traffic flow 505, and a higher traffic fidelity rate would therefore be unnecessary to enable replication by the digital twin device 145 of the operations of the source network device 105.

In the operation 600, packet information is collected at multiple stages, namely, stage 605 and stage 610. Stage 605 occurs generally at a point where a packet of the network traffic flow 505 has flowed through the ingress location 115 and is entering the data plane 125. For example, information collected at stage 605 can include metadata about the ingress location 115, such as information regarding an interface of the ingress location 115, as well as information regarding the source network device 105 and/or network traffic flow 505 up to level 4 (the transport layer) in the OSI model. Stage 610 occurs generally at a point where the packet is exiting the data plane 125 and entering the egress location 120. For example, information collected at stage 610 can include metadata about the egress location 120, such as information regarding an interface of the egress location 120, as well as information regarding the source network device 105 and/or network traffic flow 505 up to level 4 in the OSI model.

The controller 150 is configured to collect the information collected at stage 605 and 610 and summarize the information in a data file 630 for transmission to the digital twin cloud 110, as shown at 635. In an example embodiment, transmission may (but does not have to) involve compression and/or buffering of the information, e.g., by buffering metadata payloads for transmission in groups. Notably, the operation 600 provides a less accurate representation of the network traffic flow 505 than may be provided by a full packet replication fidelity rate, yet provides enough information about the network traffic flow 505 to enable the digital twin device 145 to represent and validate like-for-like traffic handling. For example, because the source network device 105 is not configured to inspect traffic in the network traffic flow 505 (through an SIP ALG or other high level inspection process), the digital twin device 145 may not be configured to conduct such inspection and, therefore, may not need actual packet payload data. Thus, the metadata can be transmitted with data indicating that the corresponding packet should have a data pattern of all 0's (or another value or other contents based on the settings in the packet header, which may or may not mirror the payload of the original packet being replicated).

Figure 7:
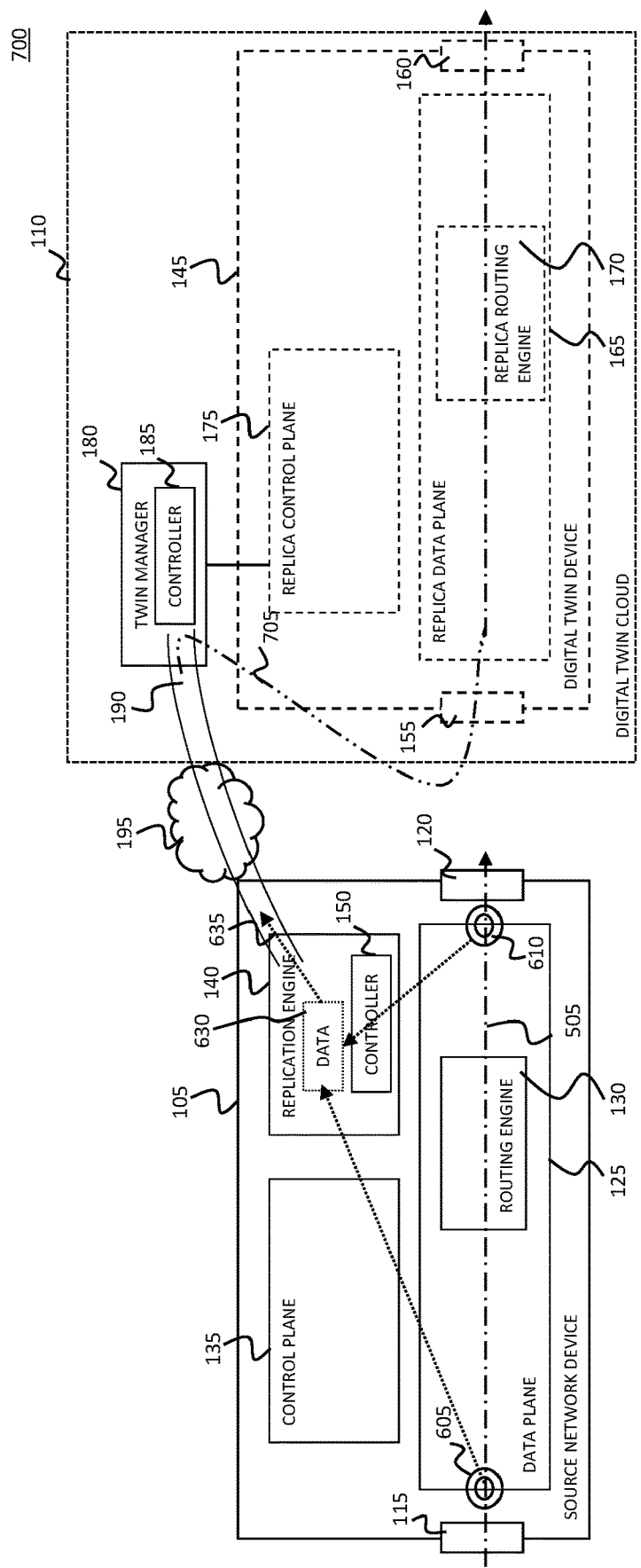
FIG. 7 is a diagram depicting a further operation for providing selective fidelity rates for network traffic replication by a digital twin device, according to an alternative example embodiment.

FIG. 7 is a diagram depicting a further operation 700 using the information collected and transmitted in operation 600. In particular, in operation 700, the controller 185 causes the information (which may be a verbatim copy of the information provided by the controller 150 or an edited or otherwise processed version of the information provided by the controller 150), to be provided to the digital twin device 145, as shown at 705. For example, the digital twin device 145 can transmit and/or process the information through a replica data path (akin to the data path of the source network device 105) including the replica ingress location 155, replica data plane 165, replica routing engine 170, and replica egress location 160. This transmission and/or processing can be used for a variety of reasons, including, for example, for modeling, simulating, and/or testing purposes.

As may be appreciated, the operation 700 is illustrative and can vary in alternative example embodiments. For example, as noted above, the controller 150 of the replication engine 140 may provide the data file 630 directly to the digital twin device 145, rather than the twin manager 180, in an alternative example embodiment. In addition, it should be understood that the configuration of the digital twin device 145 does not necessarily have to match the configuration of the source network device 105. For example, the digital twin device 145 may be called upon to test a new configuration that involves an additional traffic inspection check beyond that provided by the source network device 105 (if any). In that circumstance, the controller 150 and/or controller 185 may elect to provide a full packet replication fidelity rate, rather than the per packet metadata replication fidelity rate depicted in FIGS. 5-7.

Moreover, it should be understood that the source network device 105 may be configured to service multiple different classes of traffic with a mix of protocols that are inspected at varying levels (e.g., SIP, H.323, FTP, etc.). Different traffic fidelity rates may be selected for each traffic flow, traffic flow type, and/or application involving the traffic flows. Accordingly, the replication engine 140 may provide a mixture of replicated traffic types with varying different traffic fidelity rates, with the twin manager 180 and/or digital twin device 145 consuming the different traffic types in parallel.

Figure 8:
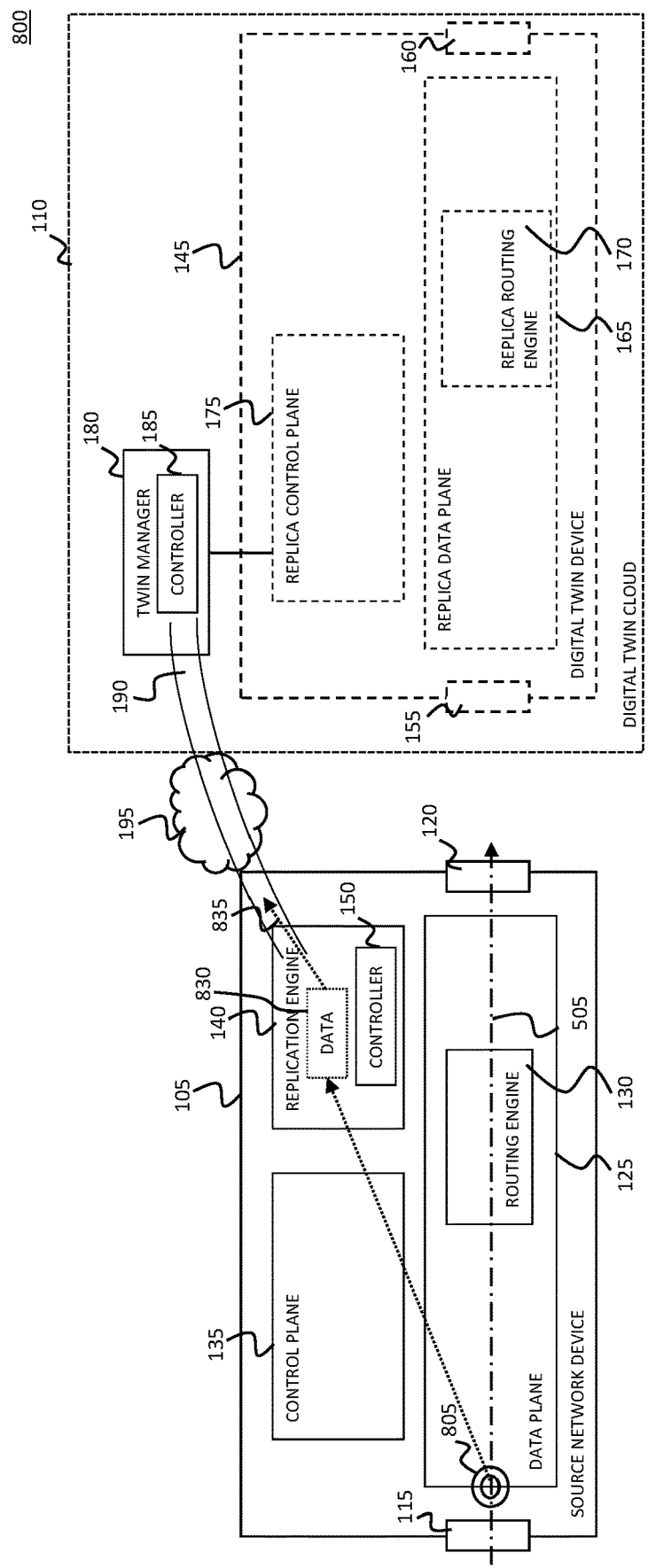
FIG. 8 is a diagram depicting an operation for providing selective fidelity rates for network traffic replication by a digital twin device, according to an alternative example embodiment.

FIG. 8 is a diagram depicting an operation 800 for providing selective fidelity rates for network traffic replication by the digital twin device 145 with respect to the network traffic flow 505, according to an alternative example embodiment. In the operation 800, the controller 150 and/or controller 185 have elected to use a traffic profile replication fidelity rate. For example, the controller 150 and/or controller 185 may have selected the traffic profile replication fidelity rate based on a configuration of the source network device 105 (e.g., because the source network device 105 is not configured to complete a high level inspection on data in the network traffic flow 505), a configuration of the digital twin device 145 (e.g., because the digital twin device 145 is not configured to complete a high level inspection on (replica) data in the network traffic flow 505), and/or an amount of available resources at the source network device 105 for traffic replication.

In the operation 800, packet information is collected at a single stage, namely stage 805. Stage 805 occurs generally at a point where a packet of the network traffic flow 505 has flowed through the ingress location 115 and is entering the data plane 125. For example, information collected at stage 805 can include metadata about the ingress location 115, such as information regarding an interface of the ingress location 115, as well as information regarding packet sizes and rates in the network traffic flow 505. For example, this fidelity rate can provide the digital twin device 145 with traffic flow characteristics, such as packet size, rate, protocol, and/or port information. In addition, or in the alternative, the digital twin device 145 may be provided information regarding any actions taken by the source network device 105 with respect to the network traffic flow 505, such as one or more routing decisions, egress interface information, an indication whether a traffic stream was dropped, etc. For example, this information may be provided (e.g., in one or more data files 830 transmitted through the tunnel 190, as shown at 835) until the traffic ceases or the endpoints (i.e., the controller 150 and the controller 185) agree to no longer replicate this traffic.

In certain applications, this fidelity rate can provide enough information regarding the network traffic flow 505 to enable the digital twin device 145 to replicate ingress traffic patterns and/or estimate performance number and throughput calculations for general traffic types, without overburdening the resources of the source network device 105 (or digital twin cloud 110). However, this fidelity rate may be inadequate for certain applications that require packet-by-packet information and/or payloads. For example, validating a like-for-like environment can be difficult using this fidelity rate because the digital twin device 145 has limited information regarding what happens to the ingressing (ingress) traffic stream, and the digital twin device 145 cannot complete testing of inspection or other ALG implementations, which rely on payload details to make their decisions.

Figure 9:
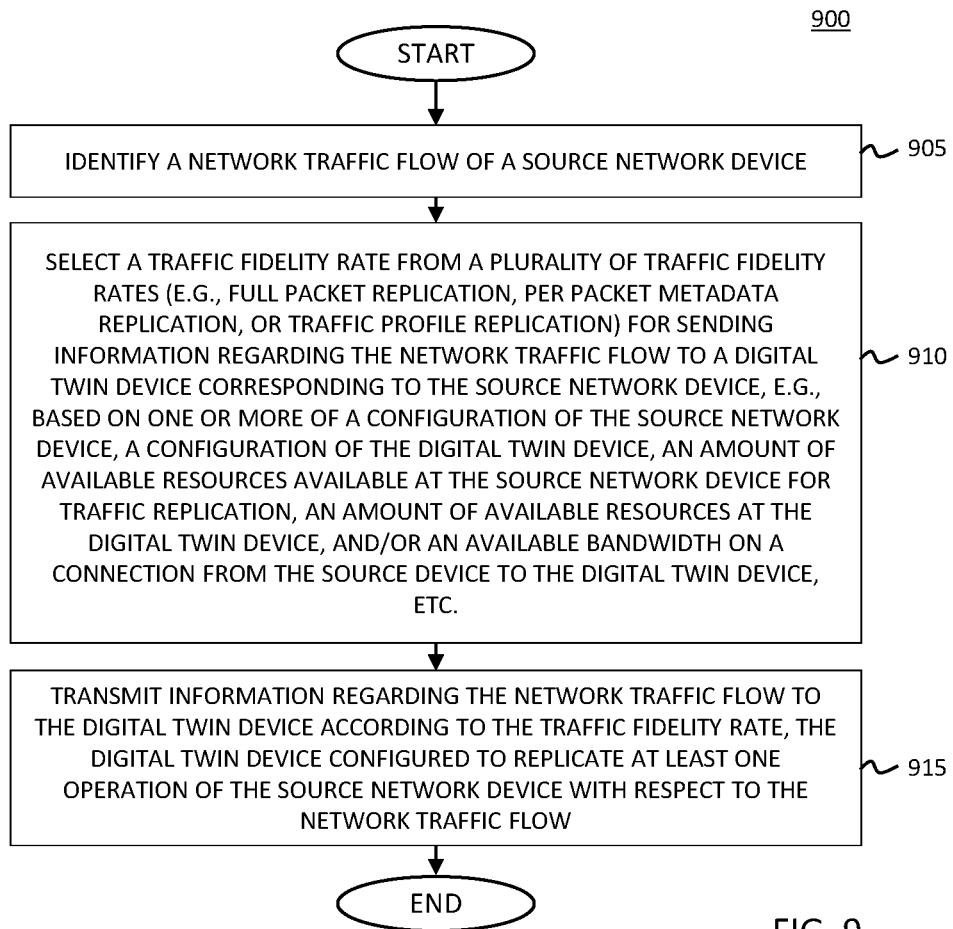
FIG. 9 is a flow chart of a method for providing selective fidelity rates for network traffic replication by a digital twin device, according to an example embodiment.

FIG. 9 is a flow chart of a method 900 for providing selective fidelity rates for network traffic replication by a digital twin device, according to an example embodiment. The method 900 is implemented by a computer executed process. For example, the method 900 may be (but does not have to be) executed by one or both of the controller 150 and/or the controller 185 described above with reference to FIGS. 1-8.

In step 905, the computer executed process identifies a network traffic flow of a source network device. The network traffic flow includes one or more packets of data flowing into the source network device. The source network device includes any physical or virtual network device, which is configured to transmit and/or process the packets along a data path.

In step 910, the computer executed process selects a traffic fidelity rate from a plurality of traffic fidelity rates for sending information regarding the network traffic flow to a digital twin device corresponding to the source network device. For example, the computer executed process can select a traffic fidelity rate for each of a plurality of different network traffic flows (e.g., based on a 5-tuple for the flow) so that the traffic fidelity rate may be different for different traffic flows. The digital twin device is a virtual and/or physical device that is configured to replicate at least one operation of the source network device with respect to the network traffic flow, e.g., for modeling, simulation, testing, or other purposes. For each traffic flow, the traffic fidelity rate can be selected from, e.g., a full packet replication fidelity rate, a per packet metadata replication fidelity rate, or a traffic profile replication fidelity rate. The computer executed process can select the traffic fidelity rate, for example, based on one or more of a configuration of the source network device, a configuration of the digital twin device, an amount of available resources available at the source network device for traffic replication, an amount of available resources at/for the digital twin device, and/or an available bandwidth on a connection from the source device to the digital twin device, etc.

For example, a full packet replication fidelity rate may be selected if the source network device has adequate resources to complete that level of replication and the digital twin device is configured to complete a high level inspection or other operation for which full packet-by-packet replication of traffic data from the source network device is required. Similarly, a lower fidelity rate may be selected where the source network device has limited resources or the source network device or digital twin device have a configuration, which permits or requires a lower traffic fidelity rate. An example process for completing the selection in step 910 is described in greater detail below, with reference to the method 1000 shown in FIG. 10.

In step 915, the computer executed process transmits information regarding the network traffic flow to the digital twin device according to the selected traffic fidelity rate. For example, the source network device can transmit the information through a secure tunnel, which may extend between the source network device and one or both of the digital twin device or a twin manager controlling the digital twin device. The digital twin device can use the provided information, for example, to replicate at least one operation of the source network device with respect to the network traffic flow. For example, the digital twin device can be configured to transmit and/or process (e.g., through inspection or otherwise) the information (either verbatim as provided by the source network device or in an edited or otherwise processed form) through a data path that includes a replica ingress location, a replica data plane (including a replica routing engine), a replica control plane, and/or a replica egress location, which generally correspond to components of the source network device. As may be appreciated, the source network device can transmit information for each of a plurality of different traffic flows according to its selected traffic fidelity rate. Thus, the source network device may simultaneously transmit information for different traffic flows with a mix of traffic fidelity rates that includes one or multiple different types of traffic fidelity rates.

Figure 10:
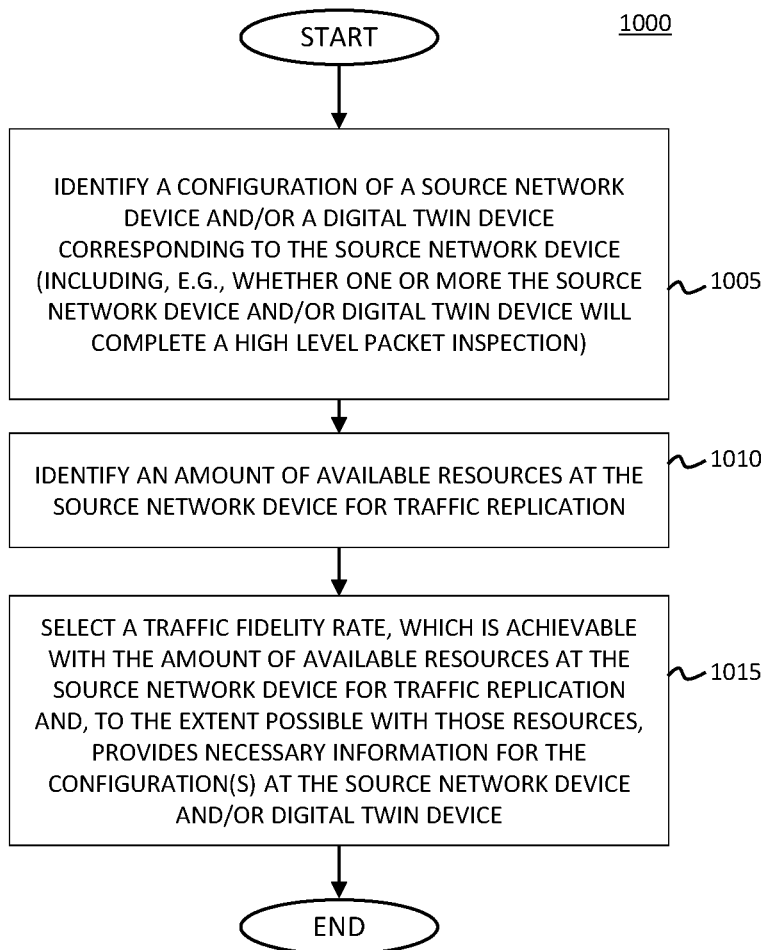
FIG. 10 is a flow chart of a method for selecting a fidelity rate for network traffic replication by a digital twin device, according to an example embodiment.

FIG. 10 is a flow chart of a method 1000 for selecting a fidelity rate for network traffic replication by a digital twin device, according to an example embodiment. For example, the method 1000 can be performed as part of an operation for selecting the fidelity rate, such as the operation 910 described above with reference to FIG. 9. The method 1000 is implemented by a computer executed process. For example, the method 1000 may be (but does not have to be) executed by one or both of the controller 150 and/or the controller 185 described above with reference to FIGS. 1-8.

In step 1005, the computer executed process identifies a configuration of a source network device and/or a digital twin device corresponding to the source network device. For example, the computer executed process can determine whether one or both of the source network device and/or digital twin device is configured to complete a high level packet inspection, such as an SIP ALG or another inspection process. The computer executed process can make this determination through any of a variety of different mechanisms. For example, the computer executed process can instruct each of the source network device and the digital twin device to self-interrogate to determine its configuration.

In step 1010, the computer executed process identifies an amount of available resources at the source network device for traffic replication. The computer executed process can identify the amount of available resources through any of a variety of different mechanisms. For example, the computer executed process can instruct the source network device to self-interrogate to determine its amount of available resources. In addition, or in the alternative, step 1010 may involve the computer executed process identifying an amount of available resources at the digital twin device and/or an available bandwidth on a connection from the source network device to the digital twin device. For example, the computer executed process can instruct the source network device and/or digital twin device (or a twin manager or other component associated therewith) to determine the amount of available resources and/or bandwidth.

In step 1015, the computer executed process selects a traffic fidelity rate, which is achievable with the amount of available resources at the source network device for traffic replication (and/or the amount of available resources at the digital twin device and/or the available bandwidth on the connection between the source network device and the digital twin device) and, to the extent possible with those resources, provides necessary information for the configuration(s) at the source network device and/or digital twin device. For example, in order to save bandwidth and reduce performance impact, the computer executed process can initially elect to replicate as little overall data as possible to achieve the objectives of the source network device and digital twin device, while still maintaining a high fidelity data set.

Figure 11:
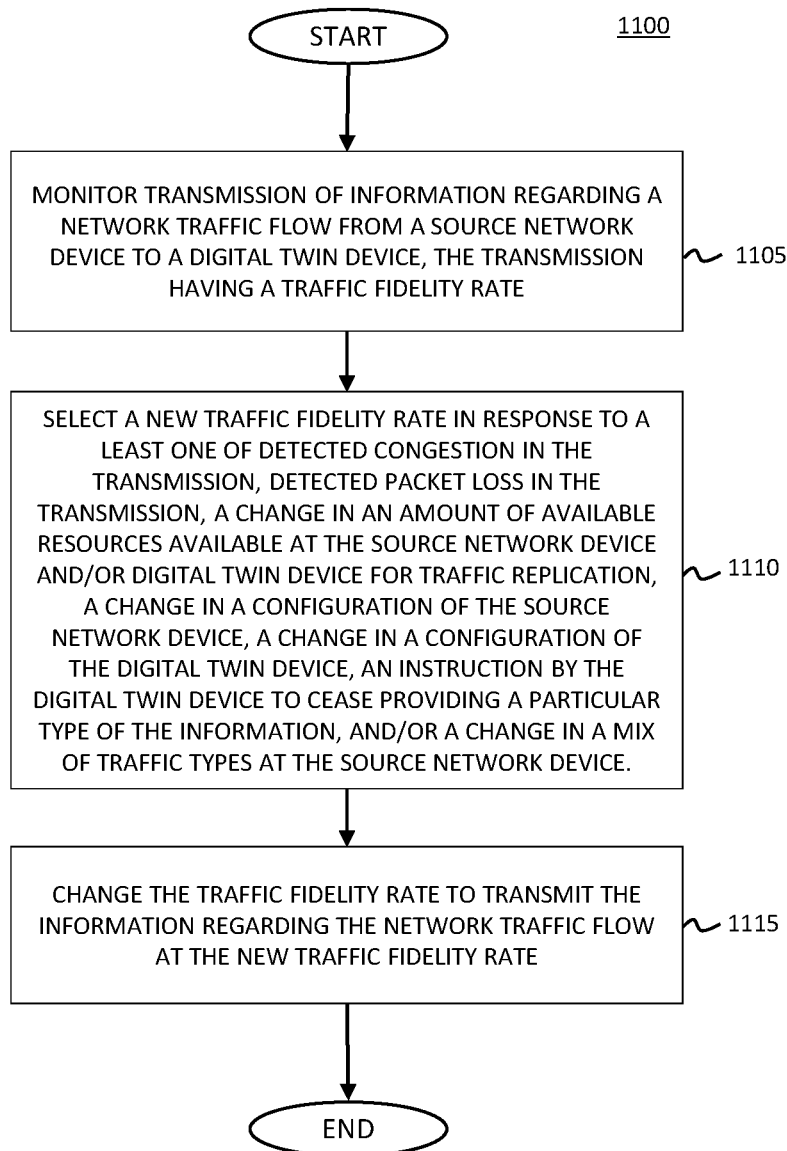
FIG. 11 is a flow chart of a method for dynamically changing a fidelity rate for network traffic replication by a digital twin device, according to an example embodiment.

FIG. 11 is a flow chart of a method 1100 for dynamically changing a fidelity rate for network traffic replication by a digital twin device, according to an example embodiment. The method 1100 is implemented by a computer executed process. For example, the method 1100 may be (but does not have to be) executed by one or both of the controller 150 and/or the controller 185 described above with reference to FIGS. 1-8.

In step 1105, the computer executed process monitors transmission of information regarding a network traffic flow from a source network device to a digital twin device. The transmission has a traffic fidelity rate, such as a full packet replication fidelity rate, a per packet metadata replication fidelity rate, or a traffic profile replication fidelity rate. For example, the transmission may be executed in accordance with a selected traffic fidelity rate, per one or more of the operations described above.

In step 1110, the computer executed process selects a new traffic fidelity rate for the information. For example, the computer executed process can select the new traffic fidelity rate in response to detected congestion in the transmitting, detected packet loss in the transmitting, a change in the amount of available resources available at the source network device and/or digital twin cloud for traffic replication, a change in the configuration of the source network device, a change in the configuration of the digital twin device, an instruction by the digital twin device to cease providing a particular type of the information, and/or a change in a mix of traffic types at the source network device.

Bandwidth congestion and/or packet loss can be detected, for example, at either end of a replication tunnel between the source network device and the digital twin device. For example, endpoints at the source network device and/or digital twin device can monitor a data stream through the tunnel for any out-of-order or lost segments. A change in the amount of available resources available at the source network device and/or digital twin cloud for traffic replication can be detected, for example, through self-interrogation by the source network device and/or digital twin cloud, as applicable. For example, the source device may detect that replication could push it over a certain performance threshold (elevated CPU, elevated memory, etc.), and/or a twin manager of the digital twin cloud may detect a resource constraint at the digital twin cloud.

The computer executed process may select a lower fidelity rate in response to detecting congestion and/or packet loss to allow the congestion and/or packet loss to subside. Similarly, the computer executed process may select a lower fidelity rate in response to detecting (or receiving information and/or instructions regarding) a resource constraint at the source network device and/or digital twin cloud. Traffic for which the lower fidelity rate may be applied can be selected, for example, based on one or more characteristics of the traffic and/or the application(s) associated with the traffic. For example, the selection can involve consideration of packet rate, size, or relevance to the applicable configuration or testing.

The fidelity rate also may be changed if the source network device and/or the digital twin device changes its configuration such that a traffic is handled differently. For example, if an inspection is added or removed or a routing is changed, the traffic that would be affected by the configuration change may be changed to a higher or lower fidelity replication method as appropriate for modeling, simulation, testing, or other purposes. For example, if the source device dynamically engages an inspection during a test, the newly inspected traffic, as well as the newly adjusted configuration, can be replicated to the digital twin device as appropriate.

In an example embodiment, the digital twin device may provide an instruction that causes a change to the traffic fidelity rate. For example, after receiving and processing a sufficient amount of certain traffic profiles or traffic types, the digital twin device may instruct the source network device to cease providing those traffic profiles or types. The digital twin device may, for example, make a programmatic determination that certain traffic flows no longer need to be replicated. For example, if the digital twin device is receiving a packet-by-packet replication of a data stream that was originally handled via a deep inspection path, but has since been offloaded, the digital twin device can ask for only flow profile data and not per-packet updates.

In step 1115, the computer executed process changes the traffic fidelity rate so that information regarding the network traffic flow is transmitted at the new traffic fidelity rate. Thus, the method 1100 of FIG. 11 allows replication fidelity to transition as appropriate to address operational requirements and resource availability.

As would be recognized by a person of skill in the art, the steps associated with the methods of the present disclosure, including method 900, method 1000, and method 1100, may vary widely. Steps may be added, removed, altered, combined, and reordered without departing from the spirit or the scope of the present disclosure. Therefore, the example methods are to be considered illustrative and not restrictive, and the examples are not to be limited to the details given herein but may be modified within the scope of the appended claims.

Figure 12:
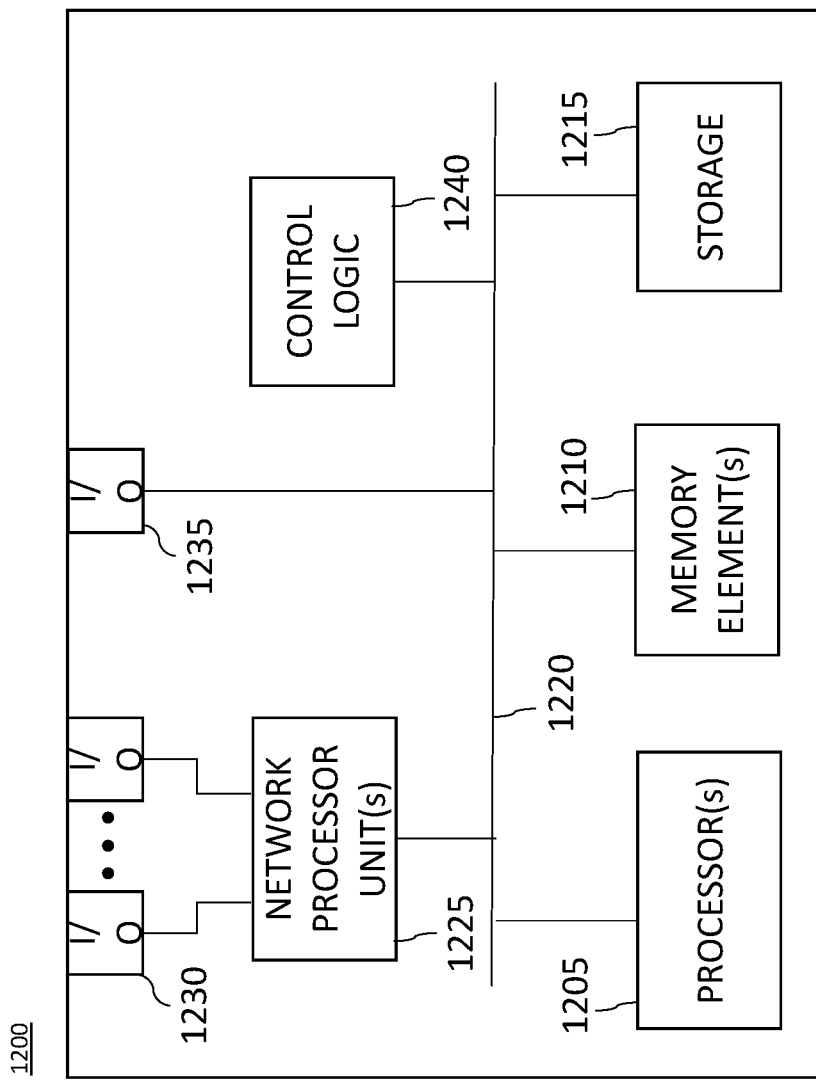
FIG. 12 is a block diagram of a computing device configured to perform the operations of dynamically changing a fidelity rate for network traffic replication by a digital twin device, according to an example embodiment.

Referring to FIG. 12, FIG. 12 illustrates a hardware block diagram of a computing device 1200 that may perform functions associated with operations discussed herein in connection with the techniques depicted in FIGS. 1-11. In various example embodiments, a computing device, such as computing device 1200 or any combination of computing devices 1200, may be configured as any entity/entities as discussed for the techniques depicted in connection with FIGS. 1-11, such as the source network device 105, digital twin cloud 110, controller 150, twin manager 180, controller 185, or digital twin device 145, in order to perform operations of the various techniques discussed herein.

In at least one embodiment, computing device 1200 may include one or more processor(s) 1205, one or more memory element(s) 1210, storage 1215, a bus 1220, one or more network processor unit(s) 1225 interconnected with one or more network input/output (I/O) interface(s) 1230, one or more I/O interface(s) 1235, and control logic 1240. In various embodiments, instructions associated with logic for computing device 1200 can overlap in any manner and are not limited to the specific allocation of instructions and/or operations described herein.

In at least one embodiment, processor(s) 1205 is/are at least one hardware processor configured to execute various tasks, operations and/or functions for computing device 1200 as described herein according to software and/or instructions configured for computing device. Processor(s) 1205 (e.g., a hardware processor) can execute any type of instructions associated with data to achieve the operations detailed herein. In one example, processor(s) 1205 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term "processor."

In at least one embodiment, memory element(s) 1210 and/or storage 1215 is/are configured to store data, information, software, and/or instructions associated with computing device 1200, and/or logic configured for memory element(s) 1210 and/or storage 1215. For example, any logic described herein (e.g., control logic 1240) can, in various embodiments, be stored for computing device 1200 using any combination of memory element(s) 1210 and/or storage 1215. Note that in some embodiments, storage 1215 can be consolidated with memory element(s) 1210 (or vice versa), or can overlap/exist in any other suitable manner.

In at least one embodiment, bus 1220 can be configured as an interface that enables one or more elements of computing device 1200 to communicate in order to exchange information and/or data. Bus 1220 can be implemented with any architecture designed for passing control, data and/or information between processors, memory elements/storage, peripheral devices, and/or any other hardware and/or software components that may be configured for computing device 1200. In at least one embodiment, bus 1220 may be implemented as a fast kernel-hosted interconnect, potentially using shared memory between processes (e.g., logic), which can enable efficient communication paths between the processes.

In various embodiments, network processor unit(s) 1225 may enable communication between computing device 1200 and other systems, entities, etc., via network I/O interface(s) 1230 to facilitate operations discussed for various embodiments described herein. In various embodiments, network processor unit(s) 1225 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1200 and other systems, entities, etc. to facilitate operations for various embodiments described herein. In various embodiments, network I/O interface(s) 1230 can be configured as one or more Ethernet port(s), Fibre Channel ports, and/or any other I/O port(s) now known or hereafter developed. Thus, the network processor unit(s) 1225 and/or network I/O interfaces 1230 may include suitable interfaces for receiving, transmitting, and/or otherwise communicating data and/or information in a network environment.

I/O interface(s) 1235 allow for input and output of data and/or information with other entities that may be connected to computer device 1200. For example, I/O interface(s) 1235 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1240 can include instructions that, when executed, cause processor(s) 1205 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1240) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term "memory element." Data/information being tracked and/or sent to one or more entities as discussed herein could be provided in any database, table, register, list, cache, storage, and/or storage structure: all of which can be referenced at any suitable timeframe. Any such storage options may also be included within the broad term "memory element" as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software (potentially inclusive of object code and source code), etc.) for execution by one or more processor(s), and/or other similar machine, etc. Generally, memory element(s) 1210 and/or storage 1215 can store data, software, code, instructions (e.g., processor instructions), logic, parameters, combinations thereof, and/or the like used for operations described herein. This includes memory element(s) 1210 and/or storage 1215 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In summary, in one form, a computer-implemented method includes identifying a network traffic flow of a source network device and selecting a traffic fidelity rate from a plurality of traffic fidelity rates for sending information regarding the network traffic flow to a digital twin device corresponding to the source network device. For example, the plurality of traffic fidelity rates can include a full packet replication fidelity rate, a per packet metadata replication fidelity rate, and a traffic profile replication fidelity rate. The computer-implemented method further includes transmitting the information regarding the network traffic flow to the digital twin device according to the traffic fidelity rate, the digital twin device configured to replicate at least one operation of the source network device with respect to the network traffic flow.

Selecting the traffic fidelity rate can involve any of a variety of different considerations. For example, selecting can include identifying a configuration of the source network device, and selecting the traffic fidelity rate based on at least the configuration of the source network device. For example, identifying the configuration of the source network device can include determining whether the source network device is configured to complete a higher level inspection for the network traffic flow. In addition, or in the alternative, selecting can include identifying a configuration of the digital twin device, and selecting the traffic fidelity rate based on the configuration of the digital twin device. For example, identifying the configuration of the digital twin device can include determining whether the digital twin device is configured to complete a higher level inspection for the network traffic flow. In addition, or in the alternative, selecting can include determining an amount of available resources available at the source network device for traffic replication, and selecting the traffic fidelity rate based on at least the amount of the available resources.

In an example embodiment, the computer-implemented method can further include monitoring the transmitting of the information regarding the network traffic flow, and changing the traffic fidelity rate to a new traffic fidelity rate based on the monitoring. For example, the changing can include changing the traffic fidelity rate in response to at least one of detected congestion in the transmitting, detected packet loss in the transmitting, a change in an amount of available resources available at the source network device for traffic replication, a change in an amount of available resources available for the digital twin device for traffic replication, a change in a configuration of the source network device, a change in a configuration of the digital twin device, an instruction by the digital twin device to cease providing a particular type of the information, or a change in a mix of traffic types at the source network device.

In another form, an apparatus comprises an interface configured to enable network communications; and one or more processors coupled to the interface and configured to perform operations including: identifying a network traffic flow of a source network device; selecting a traffic fidelity rate from a plurality of traffic fidelity rates for sending information regarding the network traffic flow to a digital twin device corresponding to the source network device; and transmitting the information regarding the network traffic flow to the digital twin device according to the traffic fidelity rate, the digital twin device configured to replicate at least one operation of the source network device with respect to the network traffic flow.

In another form, one or more non-transitory computer readable storage media include instructions that, when executed by at least one processor, are operable to: identify a network traffic flow of a source network device; select a traffic fidelity rate from a plurality of traffic fidelity rates for sending information regarding the network traffic flow to a digital twin device corresponding to the source network device; and transmit the information regarding the network traffic flow to the digital twin device according to the traffic fidelity rate, the digital twin device configured to replicate at least one operation of the source network device with respect to the network traffic flow.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio- Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method for modeling operations with respect to data in a network traffic flow, the computer-implemented method comprising:
   identifying, by one or more processors, the network traffic flow of a source network device;
   selecting, by the one or more processors, a traffic fidelity rate from a plurality of traffic fidelity rates for sending information regarding the network traffic flow to a digital twin device corresponding to the source network device;

transmitting, by the one or more processors, the information regarding the network traffic flow to the digital twin device according to the traffic fidelity rate, the digital twin device configured to replicate at least one operation of the source network device with respect to the network traffic flow; and changing, by the one or more processors, the traffic fidelity rate when a change occurs to the transmitting of the information, the change being in response to at least one of: detected congestion in the transmitting, detected packet loss in the transmitting, a change in an amount of available resources available at the source network device for traffic replication, a change in an amount of available resources available for the digital twin device for traffic replication, a change in a configuration of the source network device, a change in a configuration of the digital twin device, an instruction by the digital twin device to cease providing a particular type of the information, or a change in a mix of traffic types at the source network device.

2. The computer-implemented method of claim 1, wherein the plurality of traffic fidelity rates comprises a full packet replication fidelity rate, a per packet metadata replication fidelity rate, and a traffic profile replication fidelity rate.

3. The computer-implemented method of claim 1, wherein selecting comprises:
identifying a configuration of the source network device; and
selecting the traffic fidelity rate based on at least the configuration of the source network device.

4. The computer-implemented method of claim 3, wherein identifying the configuration of the source network device comprises determining whether the source network device is configured to complete a higher level inspection for the network traffic flow.

5. The computer-implemented method of claim 1, wherein selecting comprises:
identifying a configuration of the digital twin device; and
selecting the traffic fidelity rate based on at least the configuration of the digital twin device.

6. The computer-implemented method of claim 5, wherein identifying the configuration of the digital twin device comprises determining whether the digital twin device is configured to complete a higher level inspection for the network traffic flow.

7. The computer-implemented method of claim 1, wherein selecting comprises:
determining an amount of available resources available at the source network device for traffic replication; and
selecting the traffic fidelity rate based on at least the amount of the available resources.

8. The computer-implemented method of claim 1, further comprising:
monitoring the transmitting of the information regarding the network traffic flow; and
changing the traffic fidelity rate to a new traffic fidelity rate based on the monitoring.

9. An apparatus for modeling operations with respect to data in a network traffic flow, the apparatus comprising:
an interface configured to enable network communications; and
one or more processors coupled to the interface and configured to:
a identify the network traffic flow of a source network device;
select a traffic fidelity rate from a plurality of traffic fidelity rates for sending information regarding the network traffic flow to a digital twin device corresponding to the source network device;
transmit the information regarding the network traffic flow to the digital twin device according to the traffic fidelity rate, the digital twin device configured to replicate at least one operation of the source network device with respect to the network traffic flow; and
change the traffic fidelity rate when a change occurs to transmitting of the information, the change being in response to at least one of: detected congestion in the transmitting, detected packet loss in the transmitting, a change in an amount of available resources available at the source network device for traffic replication, a change in an amount of available resources available for the digital twin device for traffic replication, a change in a configuration of the source network device, a change in a configuration of the digital twin device, an instruction by the digital twin device to cease providing a particular type of the information, or a change in a mix of traffic types at the source network device.

10. The apparatus of claim 9, wherein the one or more processors are configured to select the traffic fidelity rate from the plurality of traffic fidelity rates, which comprise full packet replication fidelity rate, a per packet metadata replication fidelity rate, and a traffic profile replication fidelity rate.

11. The apparatus of claim 9, wherein the one or more processors are configured to select the traffic fidelity rate based on at least one of a configuration of the source network device and a configuration of the digital twin device.

12. The apparatus of claim 9, wherein the one or more processors are configured to select the traffic fidelity rate based on at least one of whether the source network device is configured to complete a higher level inspection for the network traffic flow, or whether the digital twin device is configured to complete a higher level inspection for the network traffic flow.

13. The apparatus of claim 9, wherein the one or more processors are configured to select the traffic fidelity rate based on at least an amount of available resources available at the source network device for traffic replication.

14. The apparatus of claim 9, wherein the one or more processors are further configured to:
monitor transmitting of the information regarding the network traffic flow; and
change the traffic fidelity rate to a new traffic fidelity rate based on monitoring of the transmitting.

15. One or more non-transitory computer readable storage media comprising instructions that, when executed by at least one processor, are operable to:
identify a network traffic flow of a source network device;
select a traffic fidelity rate from a plurality of traffic fidelity rates for sending information regarding the network traffic flow to a digital twin device corresponding to the source network device;
transmit the information regarding the network traffic flow to the digital twin device according to the traffic fidelity rate, the digital twin device configured to replicate at least one operation of the source network device with respect to the network traffic flow; and
change the traffic fidelity rate when a change occurs to transmitting of the information, the change being in response to at least one of: detected congestion in the transmitting, detected packet loss in the transmitting, a change in an amount of available resources available at the source network device for traffic replication, a change in an amount of available resources available for the digital twin device for traffic replication, a change in a configuration of the source network device, a change in a configuration of the digital twin device, an instruction by the digital twin device to cease providing a particular type of the information, or a change in a mix of traffic types at the source network device.

16. The one or more non-transitory computer readable storage media of claim 15, wherein the instructions further cause the processor to select the traffic fidelity rate from the plurality of traffic fidelity rates, which comprise full packet replication fidelity rate, a per packet metadata replication fidelity rate, and a traffic profile replication fidelity rate.

17. The one or more non-transitory computer readable storage media of claim 15, wherein the instructions further cause the processor to select the traffic fidelity rate based on at least one of a configuration of the source network device and a configuration of the digital twin device.

18. The one or more non-transitory computer readable storage media of claim 15, wherein the instructions further cause the processor to select the traffic fidelity rate based on at least an amount of available resources available at the source network device for traffic replication.

19. The one or more non-transitory computer readable storage media of claim 15, wherein the instructions further cause the processor to:

monitor transmitting of the information regarding the network traffic flow; and change the traffic fidelity rate to a new traffic fidelity rate based on monitoring of the transmitting.

20. The one or more non-transitory computer readable storage media of claim 17, wherein the instructions further cause the processor to identify at least one of the configuration of the source network device and the digital twin device based on whether at least one of the source network device and the digital twin device is configured to complete a higher level inspection for the network traffic flow.

* * * * *